United States Patent
Park

(10) Patent No.: US 7,188,293 B2
(45) Date of Patent: Mar. 6, 2007

(54) RLP FRAME RECEIVING METHOD

(75) Inventor: Eun-Young Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 10/755,391

(22) Filed: Jan. 13, 2004

(65) Prior Publication Data

US 2004/0165572 A1    Aug. 26, 2004

(30) Foreign Application Priority Data

Feb. 6, 2003    (KR) .................. 10-2003-0007496

(51) Int. Cl.
*G08C 25/00* (2006.01)
*H04L 1/18* (2006.01)

(52) U.S. Cl. .................................... 714/748
(58) Field of Classification Search .............. 714/748
See application file for complete search history.

(56) References Cited

U.S. PATENT DOCUMENTS 6,826,168 B2 * 11/2004 Galyas et al. ............... 370/340
6,898,181 B1 * 5/2005 Rasanen ..................... 370/231
6,996,079 B1 * 2/2006 Bergenwall et al. ........ 370/331

FOREIGN PATENT DOCUMENTS

| CN | 1389031 A | 1/2003 |
|---|---|---|
| JP | 2000/261496 | 9/2000 |
| KR | 10-2001-0061319 | 7/2001 |

OTHER PUBLICATIONS

Wireless Video Transport Using Conditional Retransmission and Low-Delay Interleaving, Supavadee Aramvith et al., v-101-v-102, May 2001.
Japanese Office Action dated Jul. 18, 2006.
Chinese Office Action dated Jul. 14, 2006.
Office Action issued by the Korean Patent Office on Apr. 30, 2005 (Korean Text Only).

* cited by examiner

*Primary Examiner*—Shelly Chase
(74) *Attorney, Agent, or Firm*—Fleshner & Kim, LLP

(57) ABSTRACT

An RLP (Radio Link Protocol) frame receiving method transmits an RLP frame entirely and quickly in consideration of a radio environment in a mobile communication system. The method discriminates an error frame from the received RLP frame, measures a degree of loss of the received RLP frame and compares the measured degree of loss with a reference value when the error frame is detected. XID parameters (Exchange Identification Parameters) set during an initial stage of reception are varied on the basis of a comparison result and retransmission is then requested of the RLP frame corresponding to the error frame on the basis of the varied XID parameters.

30 Claims, 4 Drawing Sheets

RLP FRAME RECEIVING METHOD

BACKGROUND OF THE INVENTION

1. Field of the Invention

The present invention relates to a mobile communication system based on a GSM (Global System for Mobile Communication) method and particularly to an RLP frame receiving method capable of transmitting an RLP (Radio Link Protocol) frame promptly and accurately.

2. Background of the Related Art

A mobile communication system allows a user to communicate with someone through radio paging and a wireless connection any time and anywhere while moving in a service area. With the development of mobile communication—related techniques, mobile communication systems can perform data communication as well as a communication using a voice grade signal. Currently, there exist mobile communication systems, using a GSM (Global System for Mobile Communication) method, which is a kind of TDMA (Time Division Multiple Access) method.

It is quite probable that mobile communication systems generate data errors due to influences of various radio environments, since the system transmits/receives data wirelessly. In order to reduce the probability of data error generation caused by radio environment characteristics, an RLP (Radio Link Protocol) has been developed.

When an error is generated in data transmitted in a frame unit, the RLP requests retransmission of the error—generated frame, in accordance with a retransmission protocol of wireless data on the basis of a NAK (Negative Acknowledge) method. Thus, the RLP can correctly transmit data wirelessly without errors.

However, a presently used transmission method of wireless data is operated uniformly without consideration of various radio environment characteristics in a radio section. Accordingly, the mobile communication system needs a method for receiving data more effectively and quickly by improving the retransmission method of the radio data.

Also, in the receiving method of an RLP frame in accordance with the conventional art, the RLP frame corresponding to an generated error frame is repeatedly transmitted by using the NAK method, so that an accurate data transmission and reception may be possible, but the method does not consider various radio environments. Accordingly, since the RLP frame corresponding to the error frame is repeatedly requested and received for a predetermined number of times in a relatively bad radio environment, an entire data transmission rate is lowered and a load in the mobile communication system is increased.

SUMMARY OF THE INVENTION

An object of the present invention is to provide a system and method for communicating data faster and more efficiently than other mobile communication systems which have been proposed.

Another object of the present invention is to achieve the aforementioned object by using improved retransmission techniques for radio data, and especially data that has to be retransmitted because of errors.

An object of the present invention is to provide an RLP frame receiving method capable of accurately receiving an RLP frame by comparing a degree of loss of an RLP frame and a reference value and thus varying XID parameters (Exchange Identification Parameters) on the basis of the comparison result when the error frame is detected from the received RLP frames.

Another object of the present invention is to provide a system and method which performs accurate transmission and reception of data by taking a radio environment into consideration, and which does so in a manner which increases data transmission rates.

Another object of the present invention is to provide an RLP frame receiving method capable of reducing transmission time of an RLP frame by comparing a degree of loss of an RLP frame and a reference value and thus varying XID parameters (Exchange Identification Parameters) on the basis of the comparison result when the error frame is detected from the received RLP frames.

Another object of the present invention is to provide an RLP frame receiving method capable of improving reliability of a user by comparing a degree of loss of an RLP frame and a reference value and varying XID parameters on the basis of the comparison result, when an error frame is detected from the received a RLP frames.

To achieve these and other advantages and in accordance with the purpose of the present invention, as embodied and broadly described herein, there is provided a method to receive an RLP frame comprising the steps of: discriminating an error frame from all the received RLP (Radio Link Protocol) frames; measuring a degree of loss of the received RLP frame and comparing the measured degree of loss and a reference value when the error frame is detected; varying XID parameters set at an initial stage of reception on the basis of the comparison result; and requesting retransmission of an RLP frame corresponding to the error frame based on the varied XID parameters.

The foregoing and other objects, features, aspects and advantages of the present invention will become more apparent from the following detailed description of the present invention when taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawing.

An RLP frame receiving method will now be described with reference to accompanying drawings.

Figure 1:
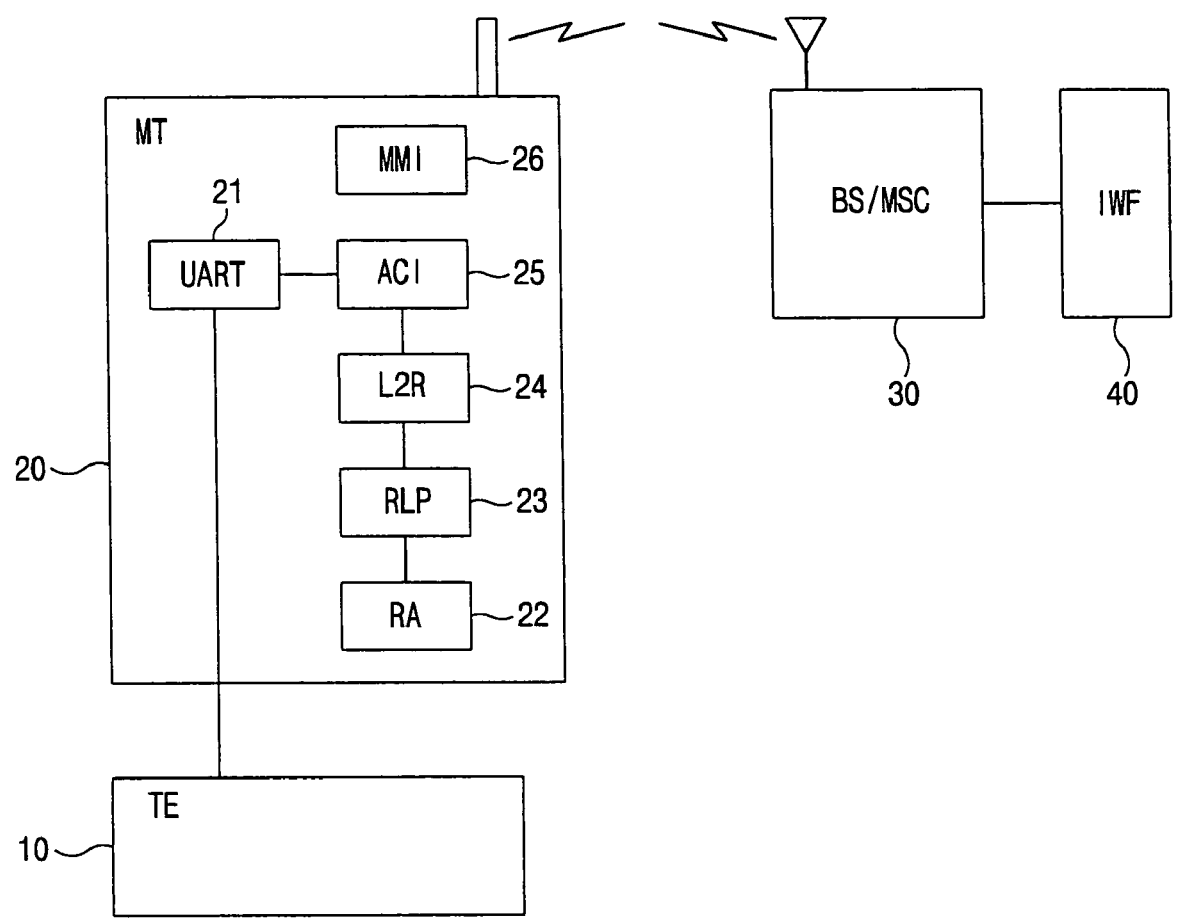
FIG. 1 is a schematic view of a GSM—based mobile communication system.

FIG. 1 is a schematic view of a general GSM-based mobile communication system. As shown in FIG. 1, the mobile communication system based on the GSM method includes a TE (Terminal Equipment) 10 for generating, analyzing and storing and inputting/outputting data. An MT (Mobile Terminal) 20 is connected with the TE 10 and wirelessly connected with another party for communication any time and anywhere. A BS/MSC (Base Station/Mobile Switching Center) 30 communicates with the MT 20, and at the same time, sets a communication path to another MT, and controls the mobile communication system based on the GSM method. An IWF (Inter-Working Function) 40 connects the BS/MSC 30 with a different public network.

The MT 20 includes a UART (Universal Asynchronous Receiver/Transceiver) 21 for transmitting/receiving data by being connected with the TE 10 and a RA (Rate Adaption) 22 for determining a transmission rate of data transmitted/received through the UART 21. An RLP 23 accurately transmits/receives data on the basis of the NAK. A L2R (Layer 2 Relay Functionality) 24 processes the transmitted/received data by being connected to a physical link. An ACI (At Command Interpreter) 25 interworks with another functional part and an MMI (Man Machine Interface) 26 has an interface function to connect equipment and a user.

Figure 2:
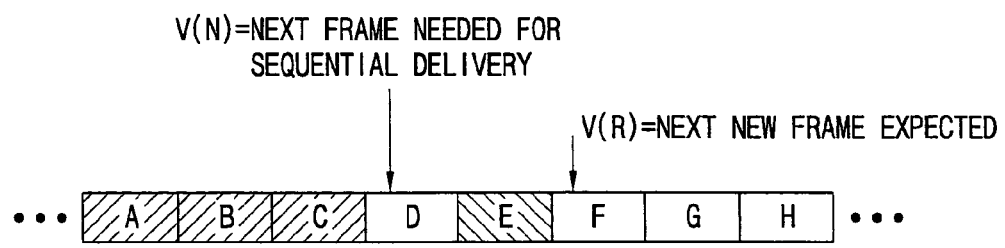
FIG. 2 illustrates state parameters for transmission/reception of a RLP frame.
Figure 2:
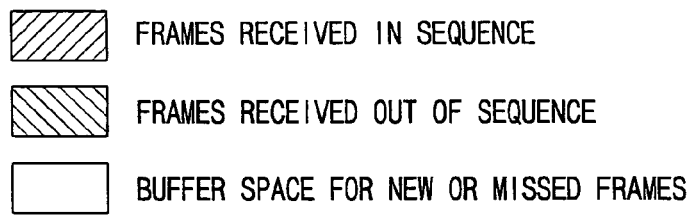
Figure 2:
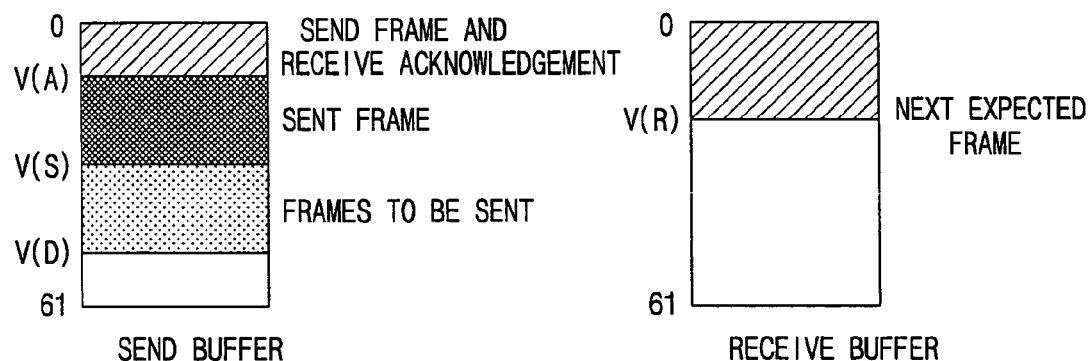

FIG. 2 illustrates state parameters for transmission/reception of a general RLP frame. As shown in FIG. 2, the RLP frame is controlled by state parameters. A V(R) (Receive State Variable) indicates a next expected reception frame, a V(S) (Send State Variable) indicates a sent RLP frame and a V(A) (Acknowledge State Variable) indicates an RLP frame which has received an ACK (Acknowledgement) frame from a receiving side in response to the sent RLP frame. That is, a sequence is assigned to each RLP frame, and the RLP frame is controlled by the state parameters such as V(R), V(A), V(S) based on the designated sequence.

Figure 3:
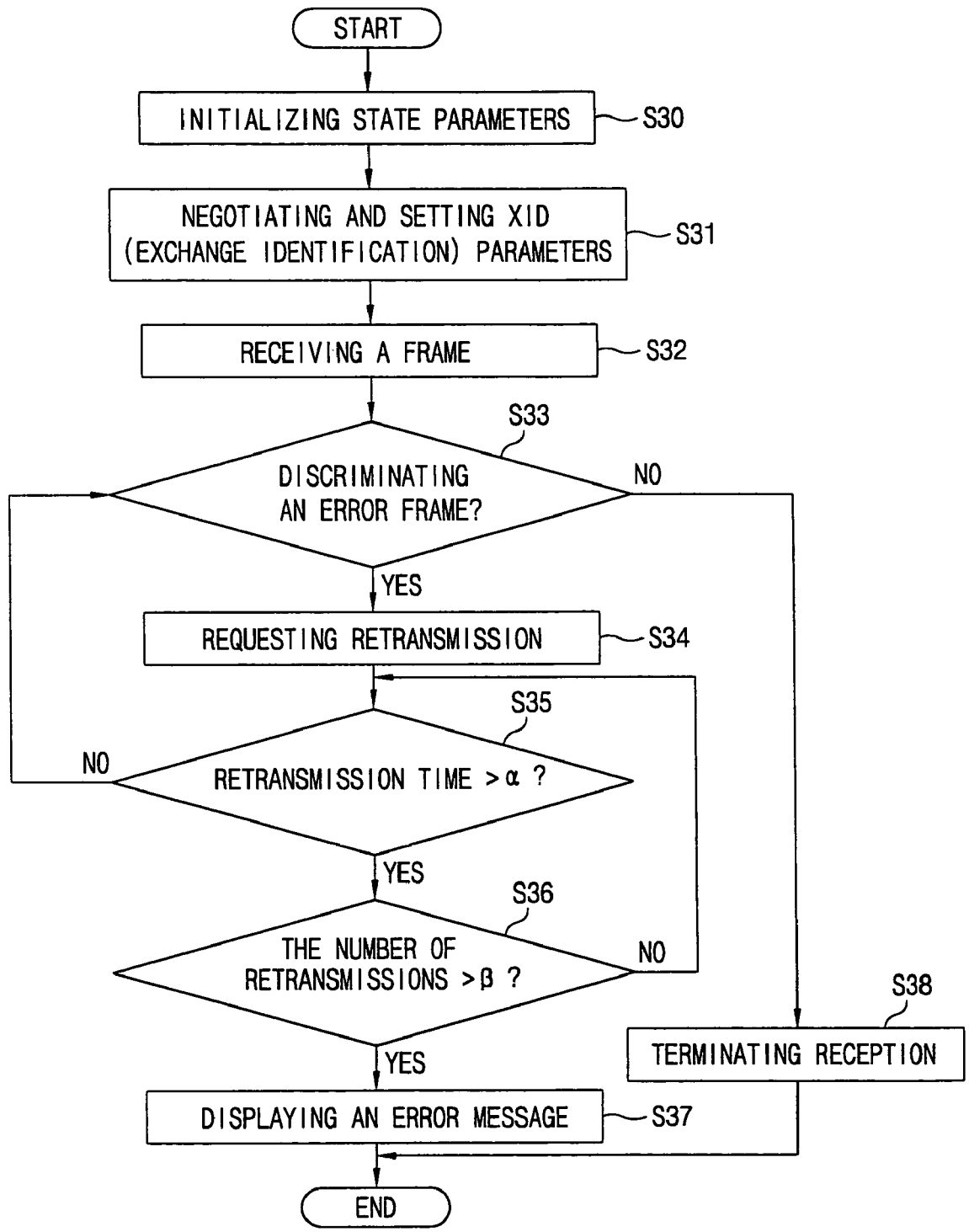
FIG. 3 is a flow chart showing an embodiment of a receiving method of an RLP frame.

FIG. 3 is a flow chart showing a receiving method of an RLP frame. An RLP frame receiving method in the mobile communication system based on the GSM method will now be described with reference to FIG. 3.

First, an MT 20 or a BS/MSC 30 initializes state parameters for managing the RLP frame S30 and sets XID parameters (Exchange Identification Parameter) for controlling transmission/reception operation of the RLP frame through negotiation S31.

The MT 20 or the BS/MSC 30 receives the RLP frames according to the sequence based on the initialized state parameters and the set exchange identification parameters S32 and discriminates an error frame from all the received RLP frames S33. Herein, the received frame means a normal frame without an error or a frame which has an error but can be corrected.

When an error frame is detected, the MT 20 or the BS/MSC 30 requests retransmission of an RLP frame of a sequence corresponding to the error frame S34. When no error frame is detected, the MT 20 or the BS/MSC 30 determines that all the RLP frames have been normally received, and terminates transmission of the RLP frame S38.

Thereafter, the MT 20 or the BS/MSC 30 compares a retransmission time of the retransmitted RLP frame with a predetermined time S35. When the former elapses the latter, the MT 20 or the MS/MSC 30 compares the number of requests for the retransmission of the RLP frame with a predetermined number S36. If the retransmission time of the retransmitted RLP frame is within the predetermined time, the MT 20 or the BS/MSC 30 discriminates an error frame from all the received RLP frames S33.

When retransmission time of the RLP frame elapses the predetermined time, the MT 20 or BS/MSC 30 compares the number of requests for retransmission of the RLP frame with the predetermined number S36. If the former is greater than the latter number, the MT 20 or the BS/MSC 30 displays an error message and terminates reception of the RLP frame S37. If the former is smaller than the latter number, the MT 20 or the BS/MSC 30 requests retransmission of the RLP frame corresponding to the error frame.

A preferred embodiment of an RLP frame receiving method capable of quickly and accurately receiving an RLP frame by comparing a degree of loss of an RLP frame and a reference value and varying XID parameters on the basis of the comparison result when the error frame is detected from the received RLP frames will now be described in detail with reference to FIG. 4.

Figure 4:
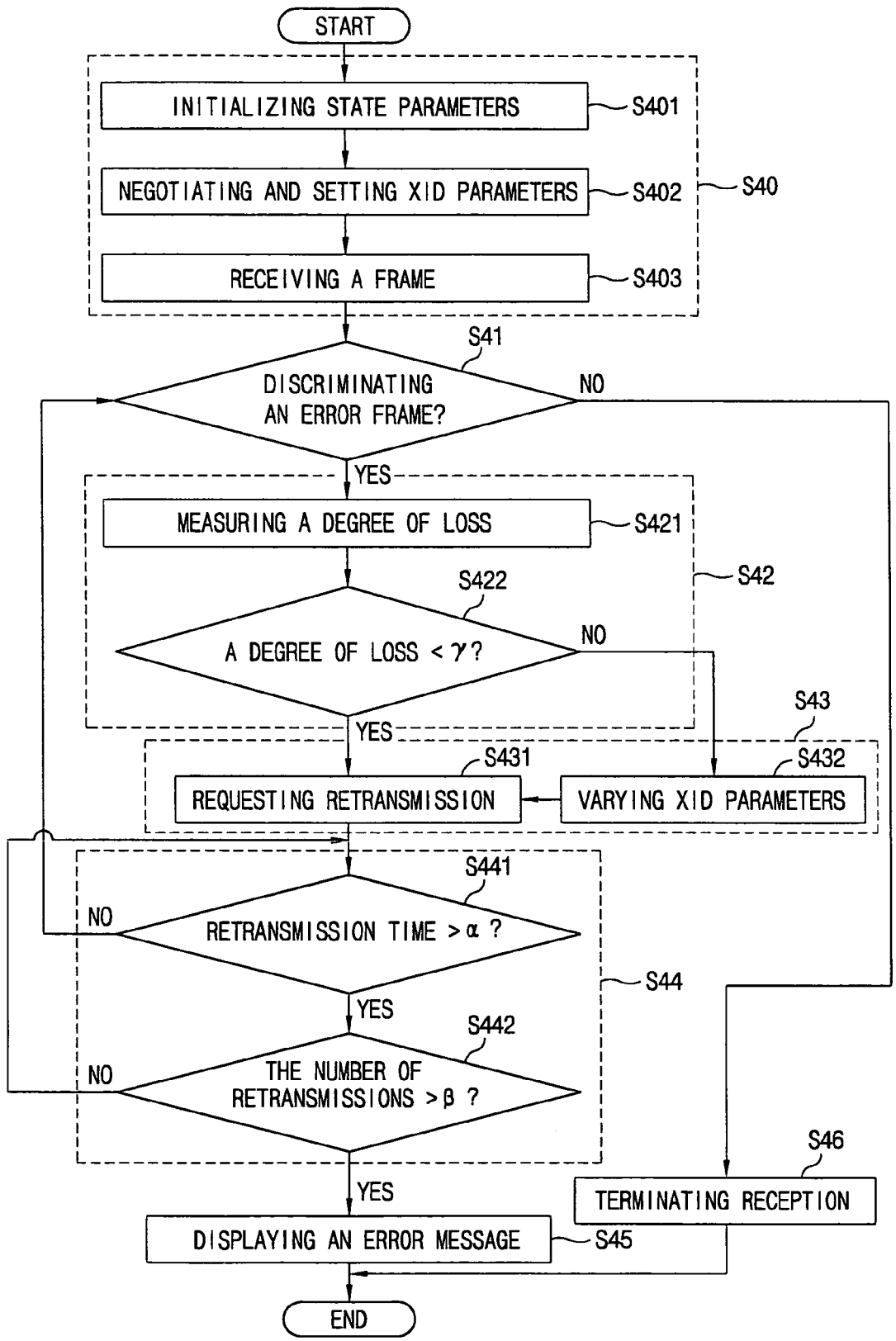
FIG. 4 is a flow chart showing another embodiment of a receiving method of an RLP frame according to the present invention.

FIG. 4 is a flow chart showing a receiving method of an RLP frame considering a radio environment according to a preferred embodiment of the present invention.

As shown in FIG. 4, an RLP frame receiving method considering various radio environments in accordance with the present invention comprises the steps of initializing state parameters for managing the RLP frame at an initial receiving stage S401; setting XID parameters for controlling transmission/reception operation of the RLP frame through negotiation S402 and receiving the RLP frames according to sequence based on the state parameters and the XID parameters S403. Next, the steps of discriminating an error frame from the received RLP frames S41, measuring a degree of loss of the RLP frame S421 and comparing the degree of loss of the RLP frame and a reference value S422 when the error frame is detected are performed. Then, retransmission is requested of an RLP frame S431 corresponding to the error frame on the basis of the XID parameters varied according to the comparison result S432. A determination is made as to whether the retransmitted RLP frame is normally received S44. When the retransmitted RLP frame is not normally received, an error message is displayed and reception of the RLP frame is terminated S45. When all of the RLP frames are normally received S46, the reception of the RLP frame is terminated. Herein, the received frame means a normal frame without an error or a frame which has an error but can be corrected.

Steps S401, S402 and S403 together perform initializing, negotiating/setting and receiving functions S40 for an RLP frame. Steps S421 and S422 together perform measuring and comparing a degree of loss S42 for the error frame. Steps S431 and S432 together request a retransmission of the RLP frame, and depending on the compared degree of loss, the XID parameters may be varied S43.

The receiving method of an RLP frame considering a radio environment according to an exemplary embodiment of the present invention will now be described in detail with reference to the GSM system of FIG. 1.

First, a channel is allocated to an MT 20 from a BS/MSC 30 by a corresponding control signal, and a call is set at the MT 20 through the allocated channel. When the call is set, the MT 20 or the BS/MSC 30 initializes state parameters for controlling the RLP frame by communicating with an MT 20 or a BS/MSC 30 of the other party S401, activates an RA determining a data transmission rate and an L2R of data link layer, and sets the XID parameters with a predetermined value through negotiation S402. The MT 20 or the BS/MSC 30 receives the RLP frames according to the sequence on the basis of the state parameters and the XID parameters S403.

The MT 20 or the BS/MSC 30 determines whether all the received frames are received according to the sequence S41. When all the RLP frames are normally received, transmission of the RLP frame is terminated S46, and when an error frame is detected from the received frames, the MT 20 or the BS/MSC 30 judges that a radio environment is relatively bad. So, at a receiving side, a degree of loss of the RLP frame is measured S421, and the measured degree of loss of the RLP frame is compared with a reference value S422. The XID parameters may include a retransmission time, the number of retransmissions and a length of a frame, and a degree of loss means a rate of an error frame generated from all the RLP frames received at the receiving side.

When the degree of frame loss is lower than the reference value, the MT 20 or the BS/MSC 30 requests retransmission of an RLP frame corresponding to the error frame on the basis of the XID parameters set at an initial stage of reception S431. When the measured degree of the RLP frame loss is greater than the reference value, the MT 20 or the BS/MSC 30 varies the XID parameters such as the retransmission time, the number of receptions and the length of the frame and requests retransmission of an RLP frame corresponding to the error frame on the basis of the varied XID parameters. That is, when the error frame is detected from the received RLP frames, and the degree of loss of the RLP frame is greater than the reference value, the MT 20 or the BS/MSC 30 varies the XID parameters S432. For example, when the MT 20 and the BS/MSC 30 varies the XID parameters in consideration of a relatively bad radio environment, the retransmission time is set to be several times longer than the set existing reception time so as to lengthen a data reception time sufficiently, and the number of retransmission requests is reduced to once, twice, or another set value so as to prevent unnecessarily repeated retransmission. In addition, the MT 20 or the BS/MSC 30 improves a BER (Bit Error Rate) by reducing a transmission time of the frame to a certain bit rate, and thus a transmission time of the whole RLP frames is reduced.

When an RLP frame corresponding to the error frame is retransmitted, the MT 20 or the BS/MSC 30 compares a retransmission time of the retransmitted RLP frame with the predetermined time S441. At this time, when the retransmission time is less than the predetermined time, the MT 20 or the BS/MSC 30 detects the error frame from the received RLP frames. If the error frame is not detected, the MT 20 or the BS/MSC 30 terminates reception of the RLP frame S46. If the retransmission time of the RLP frame requested retransmission is within the predetermined time, the retransmitted RLP frame is normally received.

When the retransmission time of the retransmitted RLP frame is not within the predetermined time, the MT 20 or the BS/MSC 30 compares the number of retransmissions of the retransmitted RLP frame with the predetermined number S442. If the former is greater than the latter, the MT 20 or the BS/MSC 30 displays an error message and terminates the reception of the RLP frame S45. If the former is smaller than the latter, the MT 20 or the BS/MSC 30 requests retransmission of an RLP frame corresponding to the error frame.

Accordingly, the RLP frame receiving method in a radio environment according to the present invention can reduce a time for an unnecessary retransmission request and the RLP frame retransmission by reducing the number of retransmission requests of the RLP frame, and can improve a bit error rate by lowering the frame transmission rate to a certain bit rate. In addition, since the method can solve problems such as a transmission delay by prolonging reception queuing time of the retransmission frame, an RLP frame can be received effectively, quickly, and without errors.

As so far described, the RLP frame receiving method in accordance with the present invention receives data for a sufficient time in consideration of a transmission delay of the data by varying XID parameters in a relatively bad radio environment, and can receive a correct RLP frame because an error generation rate is reduced by lowering the data transmission rate.

The RLP frame receiving method in accordance with the present invention can reduce the whole RLP frame transmission time by varying XID parameters in a relatively bad radio environment so as to prevent an unnecessary retransmission request and retransmission.

Also, the RLP frame receiving method in accordance with the present invention can improve reliability for a user of a mobile communication system because the RLP frame is received without an error in transmission through a radio environment by varying XID parameters in a relatively bad radio environment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An RLP (Radio Link Protocol) frame receiving method, comprising:
   discriminating an error frame from received RLP frames;
   measuring a degree of loss of the received RLP frame and comparing the measured degree of loss with a reference value when an error frame is detected;
   varying XID (Exchange Identification) parameters set at an initial stage of reception on the basis of a comparison result; and
   requesting retransmission of an RLP frame corresponding to the error frame on the basis of the varied XID parameters.

2. The method of claim 1, wherein the degree of loss of the RLP frame is a rate of the error frame from all RLP frames to be received.

3. The method of claim 1, wherein the XID parameters include a retransmission time of the error frame, a number of retransmission requests of the error frame and a length of the RLP frame.

4. The method of claim 1, wherein the discriminating further comprises:
terminating the reception of the RLP frame when the error frame is not detected from all the received RLP frames.

5. The method of claim 1, wherein the measuring and comparing includes:
varying the XID parameters and requesting retransmission of an RLP frame corresponding to the error frame on the basis of the varied XID parameters when the measured degree of loss is greater than the reference value; and
requesting retransmission of an RLP frame corresponding to the error frame on the basis of the XID parameters set at the initial stage of the reception when the measured degree of loss is not greater than the reference value.

6. The method of claim 1, further comprising:
determining whether a retransmitted RLP frame is normally received.

7. The method of claim 6, wherein the determining further comprises:
comparing a retransmission time of the retransmitted RLP frame and a predetermined time; and
comparing the number of retransmission requests of the RLP frame and a predetermined number when the retransmission time of the RLP frame elapses the predetermined time.

8. The method of claim 7, wherein comparing a retransmission time further comprises:
requesting retransmission of an RLP frame when the retransmission time of the retransmitted RLP frame is within the predetermined time.

9. The method of claim 7, wherein comparing the number of retransmission requests further comprises:
displaying an error message, and terminating the reception of the RLP frame when the number of retransmission requests of the retransmitted RLP frame exceeds the predetermined number; and
requesting retransmission of an RLP frame when the number of retransmission requests of the retransmitted RLP frame does not exceed the predetermined number.

10. A method of receiving a radio link protocol frame, comprising:
receiving data including a radio link protocol frame;
discriminating an error frame from said received data;
varying at least one exchange identification parameter based on a comparison result; and
requesting retransmission of said error frame using said at least one varied exchange identification parameter.

11. The method of claim 10, wherein discriminating the error frame includes:
measuring a degree of loss of the received radio link protocol frame;
comparing said measured degree of loss with a reference value; and
generating said comparison result from said comparing.

12. The method of claim 11, wherein said measuring, said comparing and said generating are only performed when an error frame is detected.

13. The method of claim 10, wherein reception of said radio link protocol frame is terminated when said discriminating does not produce an error frame.

14. The method of claim 10, further comprising:
comparing a time taken for a retransmission of said radio link protocol frame to a predetermined time;
comparing a number of retransmissions to a predetermined number when said time taken for a retransmission is greater than said predetermined time; and
displaying an error message and terminating reception of said radio link protocol frame.

15. The method of claim 14, wherein said discriminating, said varying, said requesting, and said comparing a time are repeated when said time taken for a retransmission is not greater than said predetermined time.

16. The method of claim 14, further comprising:
requesting retransmission of said radio link protocol frame corresponding to said error frame when said number of retransmissions is not greater than said predetermined number.

17. The method of claim 10, wherein said retransmitted radio link protocol frame corresponds to said error frame.

18. The method of claim 10, wherein said at least one exchange identification parameter includes at least one of a retransmission time of said error frame, a number of retransmission requests of said error frame, and a length of said radio link protocol frame.

19. The mobile terminal receiver of claim 18, wherein said mobile terminal receiver is used in a global system for mobile communication network.

20. A mobile terminal receiver, comprising:
an antenna receiving data; and
a controller which varies at least one exchange identification parameter used for transmitting a radio link protocol frame based on a degree of loss of a previously received radio link protocol frame.

21. The mobile terminal receiver of claim 20, further comprising:
a universal asynchronous receiver/transceiver;
a rate adaption;
a radio link protocol;
a layer 2 relay function;
an at command interpreter; and
a man machine interface.

22. The mobile terminal receiver of claim 20, where said at least one exchange identification parameter includes at least one of a retransmission time of an error frame, a number of retransmission requests of said error frame, and a length of said radio link protocol frame.

23. A method for controlling data transmission in a mobile communication system, comprising:
receiving a number of radio link protocol frames;
determining existence of an error frame in the received radio link protocol frames cause by an adverse radio environment;
adjusting an exchange identification parameter based on detection of the error frame; and
requesting retransmission of at least the error frame using the adjusted exchange identification parameter.

24. The method of claim 23, wherein said determining the existence of an error frame includes:
measuring a degree of loss of one of said received radio link protocol frames;
comparing said measured degree of loss with a reference value; and
generating a comparison result from said comparing.

25. The method of claim 24, wherein said measuring, said comparing and said generating are only performed when an error frame is detected.

26. The method of claim 23, wherein reception of said radio link protocol frames is terminated when an error frame does not exist.

27. The method of claim 23, further comprising:
comparing a time taken for a retransmission of at least said error frame to a predetermined time;
comparing a number of retransmissions to a predetermined number when said time taken for a retransmission is greater than said predetermined time; and
displaying an error message and terminating reception of said radio link protocol frames.

28. The method of claim 27, wherein said discriminating, said varying, said requesting, and said comparing a time are repeated when said time taken for a retransmission is not greater than said predetermined time.

29. The method of claim 27, further comprising:
requesting retransmission of at least said error frame when said number of retransmissions is not greater than said predetermined number.

30. The method of claim 23, wherein said exchange identification parameter includes at least one of a retransmission time of said error frame, a number of retransmission requests of said error frame, and a length of said radio link protocol frame.

* * * * *